Figure 1:
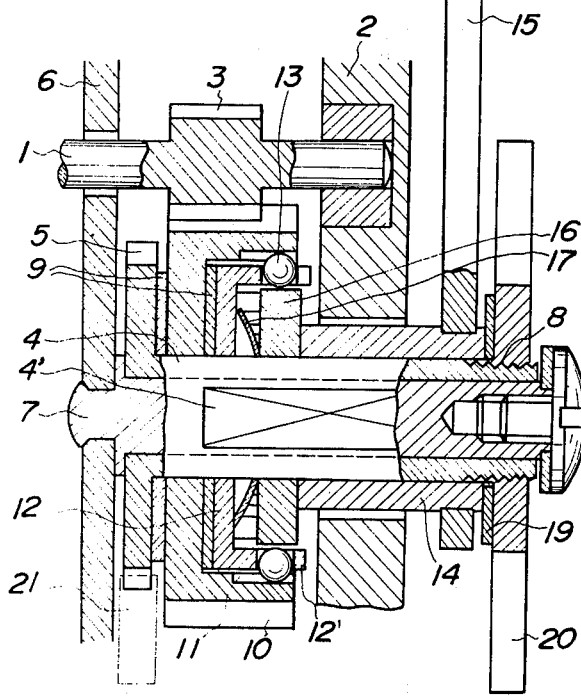

United States Patent [19]
Fukushima

[11] 3,874,615
[45] Apr. 1, 1975

[54] FISHING REELS
[75] Inventor: Noriyasu Fukushima, Saitama, Japan
[73] Assignee: Daiwa Seiko Incorporated, Tokyo, Japan
[22] Filed: July 3, 1973
[21] Appl. No.: 376,238

[30] Foreign Application Priority Data
July 27, 1972  Japan.................................. 47-75616
Oct. 13, 1972  Japan......................... 47-119069

[52] U.S. Cl................. 242/219, 192/19, 192/41 A, 192/43.2, 192/44, 242/220
[51] Int. Cl............................................. A01k 89/00
[58] Field of Search ............ 242/218, 220, 219, 213, 242/214; 192/14, 19, 41 A, 43.2, 44, 45, 93 R

[56] References Cited
UNITED STATES PATENTS
929,867    8/1909    Meisselbach et al. .............. 242/220
1,836,755  12/1931   Hirsch................................ 242/213
2,613,883  10/1952   Limpright........................... 242/220
3,139,241   6/1964   Johnson............................. 242/214

Primary Examiner—Billy S. Taylor
Attorney, Agent, or Firm—Browdy & Neimark

[57] ABSTRACT

A fishing reel whereby when the crank handle is actuated in direction for reeling in the fishing line drawing-up, the handle shaft is directly coupled with a line spooling or winding member or a rotor to forcedly reel in the fishing line, and when the handle is turned in the opposite direction, the handle shaft acts to frictionally keep the spooling member or rotor against rotation to allow play-out of the fishing line, and whereby, in addition to the above-said, when the handle shaft is in a mode tending to turn in the line reeling-in direction, backward rotation of the spooling member or rotor can be checked to prevent unnecessary play-out of the fishing line even if the angler does hold the handle with his hand, thus allowing the angling operation only with a simple handle manipulation and also providing great versatility in use of fishing reels regardless of the condition of the fishing places or the fishing manners used by the angler.

8 Claims, 21 Drawing Figures

FIG.5
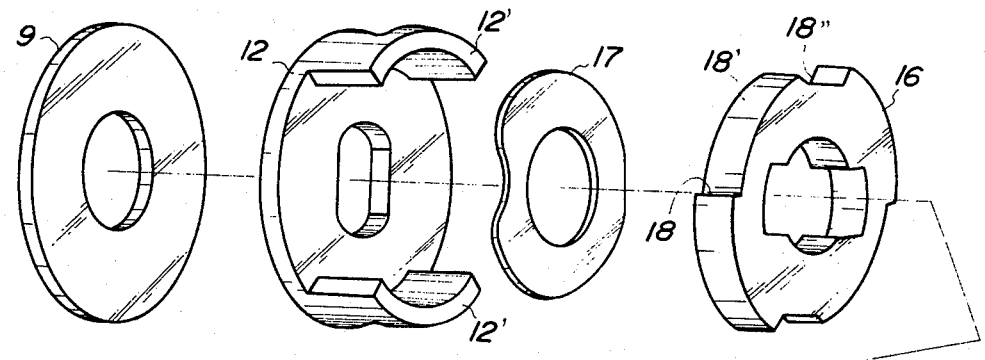
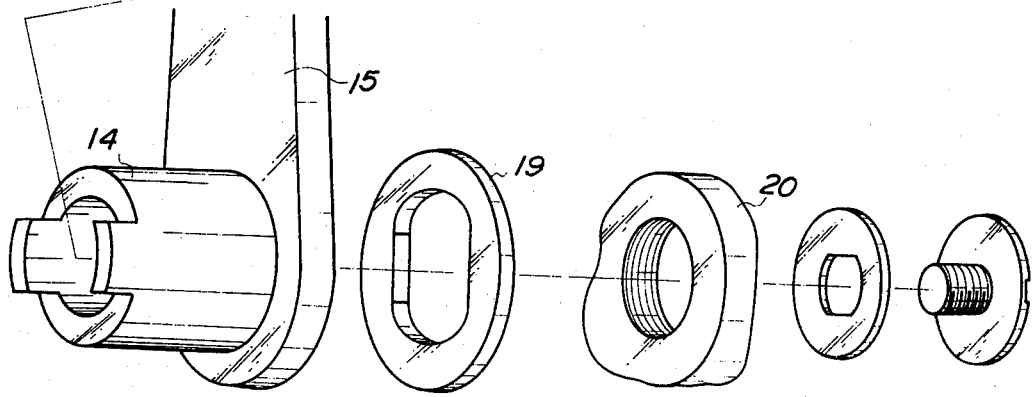

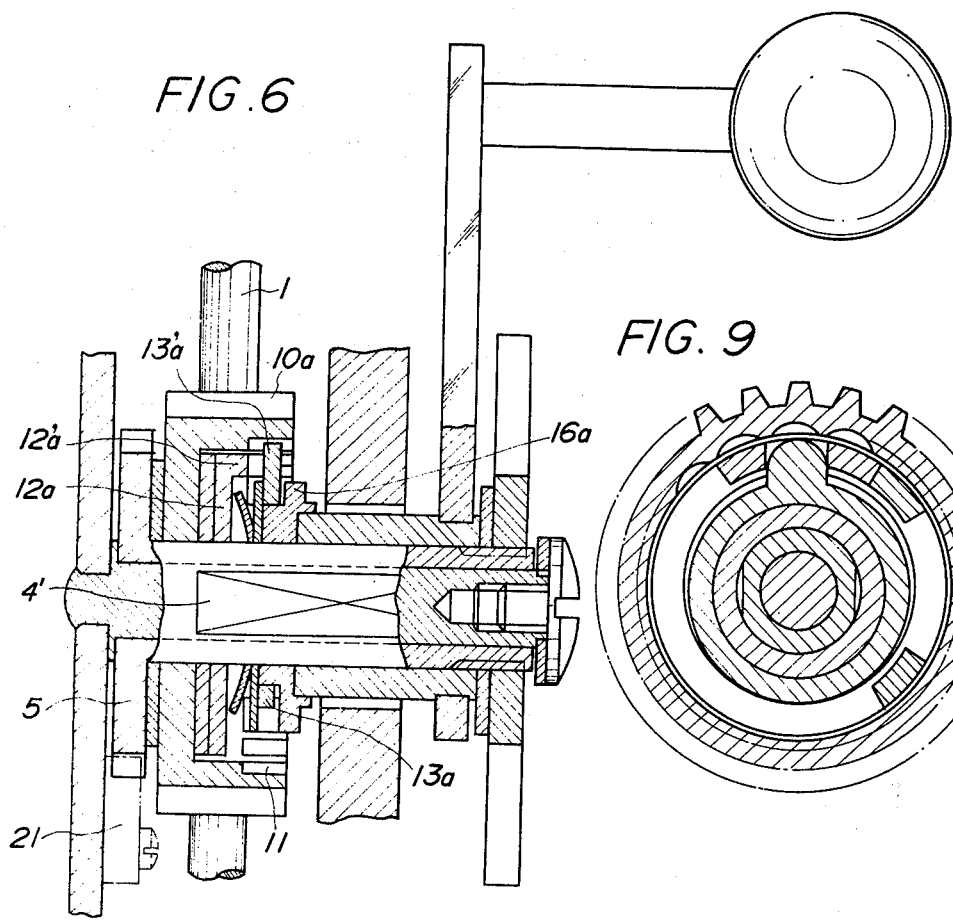

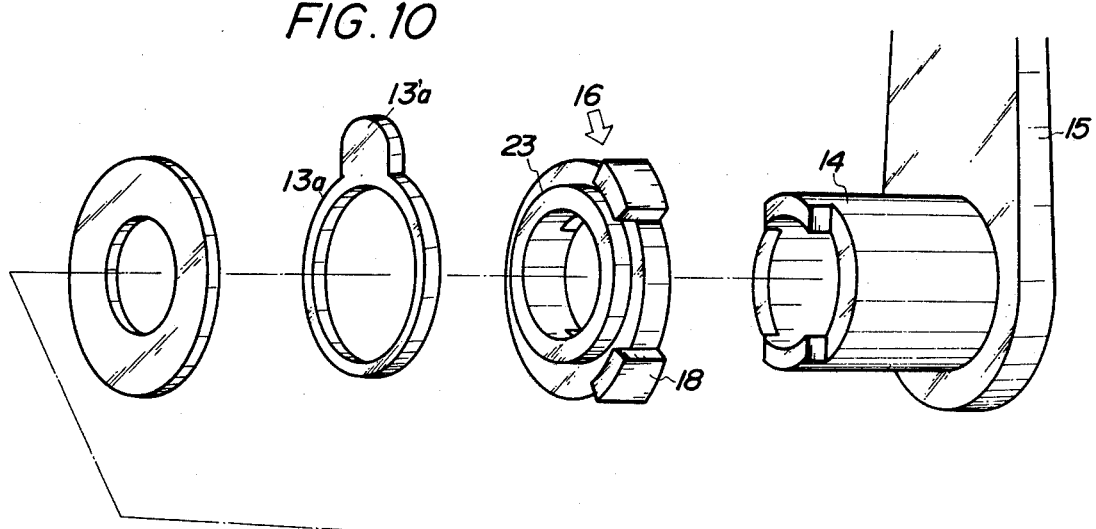
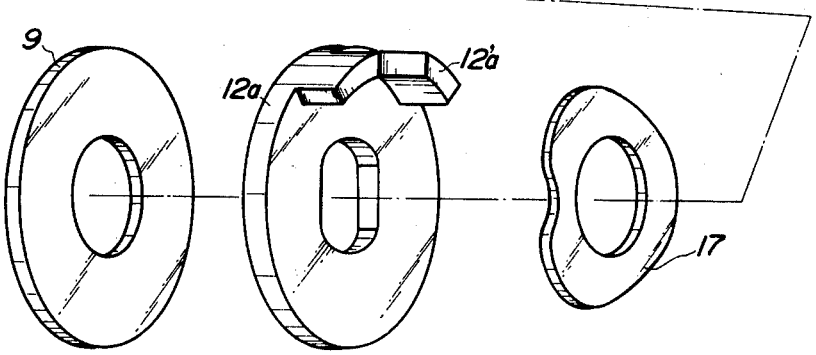
FIG. 10

FIG. 14
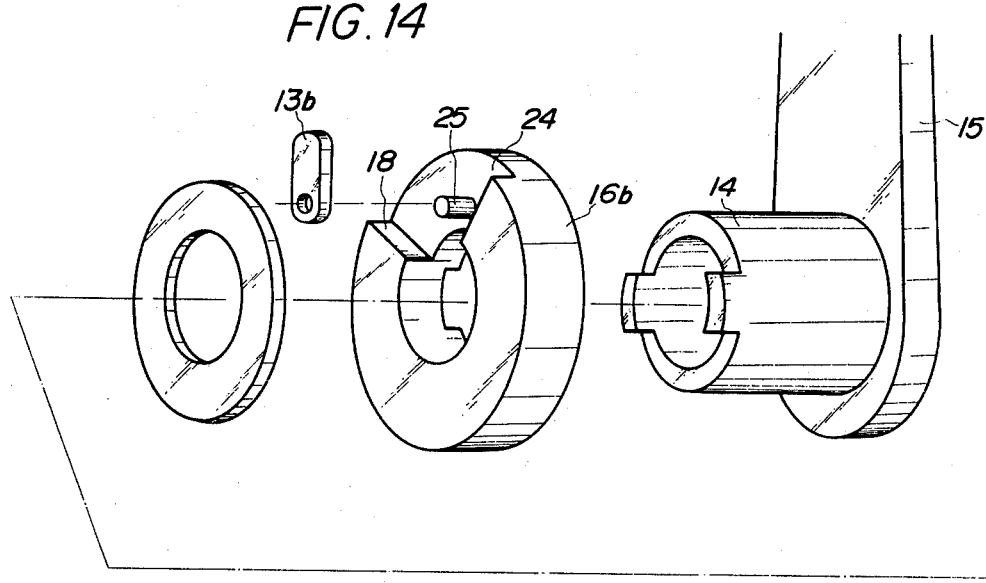
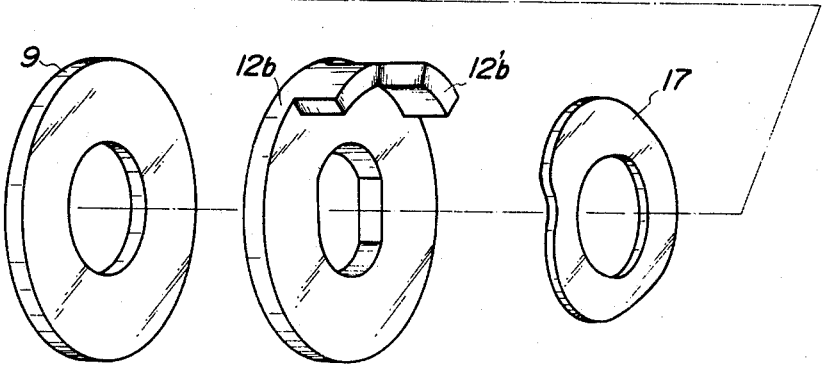

FISHING REELS

This invention relates to the non-rotatable spool type fishing reels, and more particularly to a novel mechanism in such type of fishing reels for facilitating the handling of the fishing line when a fish is caught.

In the so-called closed-face non-rotatable spool type fishing reels, mechanisms are known in which arrangement is made such that when the crank handle is turned in the direction for reeling in the fishing line, the line spooling member and crank handle are directly coupled to each other to let the spooling member turn accordingly, while when the handle is turned in the opposite direction, the handle is frictionally engaged with the spooling member, as for instance proposed in U.S. Pat. No. 3,139,241 and granted to Lloyd E. Johnson, Japanese Pat. Pub. No. 18617/1972. However, with reels having such arrangement alone, when the angler releases the crank handle upon lowering of baited hooks into water or for other reasons the fishing line is forcedly played out against the frictional drag acting thereto and can not be stopped quickly. Therefore, in order to better prevent the fishing line from being played out by accident, the angler must keep his hold of the crank handle with his hand.

Therefore, the present invention has for its primary purpose to provide a fishing reel whereby when the crank handle is actuated in the direction for reeling in the fishing line the handle shaft is directly coupled with a line spooling or winding member or a rotor to forcedly reel in the fishing line, and when the handle is turned in the opposite direction, the handle shaft acts to frictionally prevent the spooling member or rotor from rotating to allow play-out of the fishing line, and whereby, in addition to the above, when the handle shaft is in a mode tending to reel the line in backward rotation of the spooling member or rotor can be checked to prevent unnecessary play-out of the fishing line even if the angler does hold the handle with his hand, thus allowing the angling operation with a simple handle manipulation and also providing great versatility in use of fishing reels regardless of the condition of the fishing places or the fishing manners used by the angler.

In accordance with a feature of the present invention, there is provided a fishing reel whereby the above object can be accomplished and which comprises a hollow rotatable shaft fitted on a fixed shaft having at its end a self-locking ratchet, a driving gear mounted loosely on said rotary shaft and meshed with a gear wheel secured to a spooling member or a rotor, locking means engageable in the grooves formed in the inner periphery of said driving gear, a retainer member supporting said locking means so as to control their circumferential movement and integrally attached to said rotary shaft, and an operating member adapted to rotate with the handle shaft connected to said rotary shaft, said operating member being arranged such that when said handle shaft is actuated in the direction for reeling in the fishing line, said operating member is brought into engagement with said retainer member and urges said locking means to move outwardly to let them engage in the corresponding grooves in said driving gear, and when said handle shaft is turned in the opposite direction, said locking means are moved inwardly to disengage from the respectives grooves in said driving gear.

In the fishing reel having the above-described arrangement, balls are used as locking means, but according to this arrangement, excess wear could take place at the edges of the engaging grooves in the driving gear as well as at the cam edges, and also it is probable that the rotation of the rotary handle shaft could become unsmooth in use. This is due to the fact that when the balls stay for example at the positions shown in FIG. 4 of the accompanying drawings, the handle shaft must turn the retainer and hollow shaft simultaneously to bring the balls into the arc-shaped grooves in the driving gear.

It is, therefore, another object of the present invention to provide a fishing reel whereby the abovediscussed defects in the ball type fishing reel provided in accordance with the first-mentioned object of this invention are eliminated to prevent wear of the engaging grooves in the driving gear and the cam portion thereof and to also permit smooth and easy engagement of the balls in the corresponding grooves.

Thus, according to another feature of the present invention, there is provided a fishing reel comprising a hollow shaft provided at its end with a self-locking ratchet, said hollow shaft being rotatably fitted in a bearing member secured to a reel housing plate, a driving gear meshed with a gear wheel on the spool shaft, said driving gear being provided behind said locking ratchet on said hollow shaft so that said gear wheel is rotatable through drag washers on both sides thereof, said driving gear being also formed with arcuate engaging portions in its inner periphery, said hollow shaft being connected to a retainer supporting the balls revolving integral with said shaft and also to a rotary handle shaft, a cam disc loosely engaged at the end of said handle shaft so that said cam disc is able to move along a predetermined distance, said cam disc being formed with cam portions arranged such that when said handle shaft is turned in the direction for reeling in the fishing line, said cam portions are engaged with said retainer to let the respective balls engage in the corresponding halfspherical grooves and another pair of cam portions arranged such that when said handle shaft is turned in the contrary direction, said balls are freed from said respective half-spherical grooves, and a spring interposed between said rotatable handle shaft and said cam disc.

Figure 3:
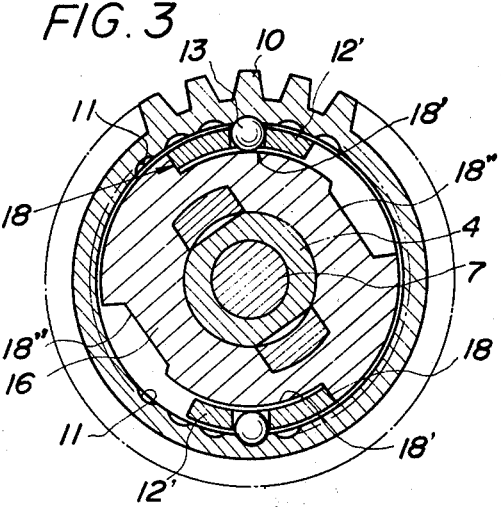
Figure 2:
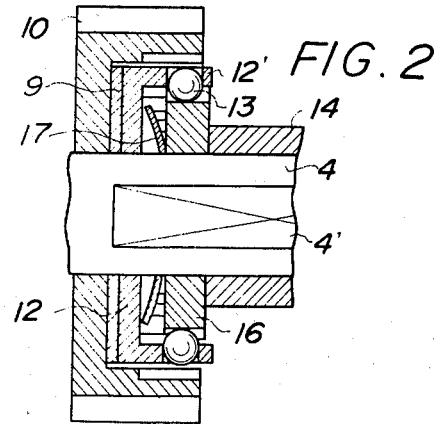
Figure 4:
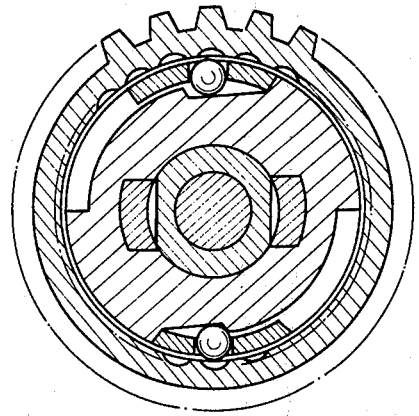
Figure 11:
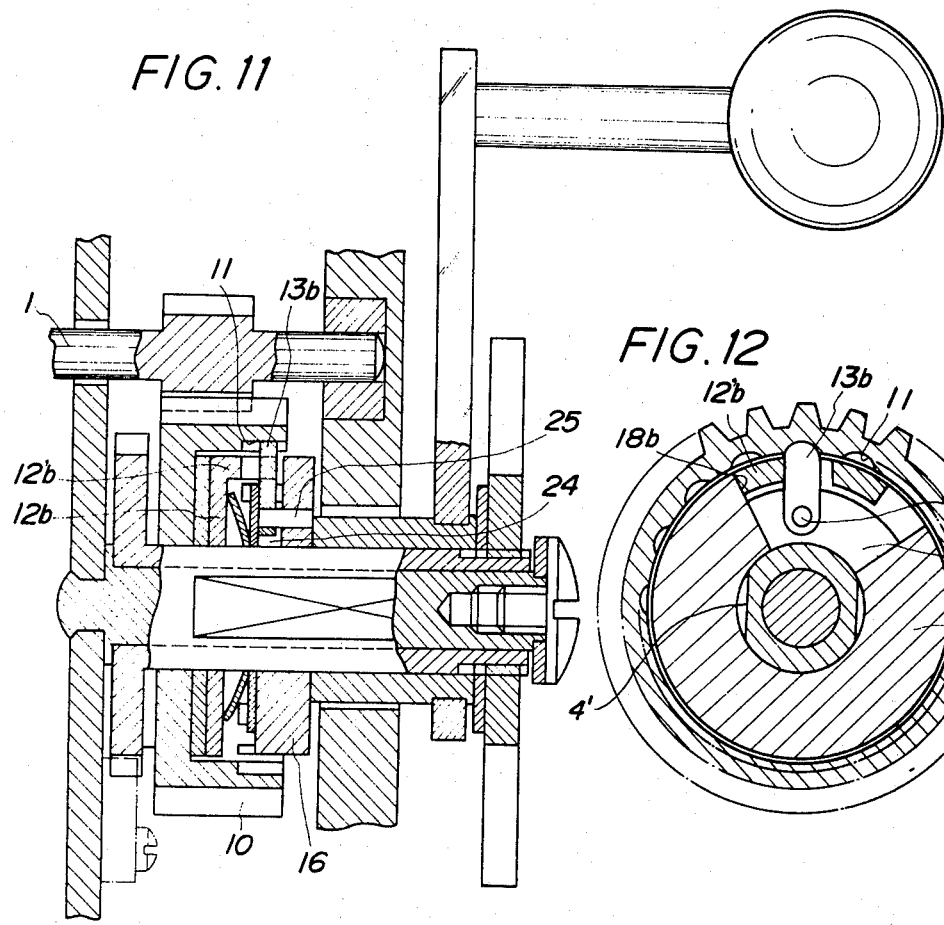
Figure 12:
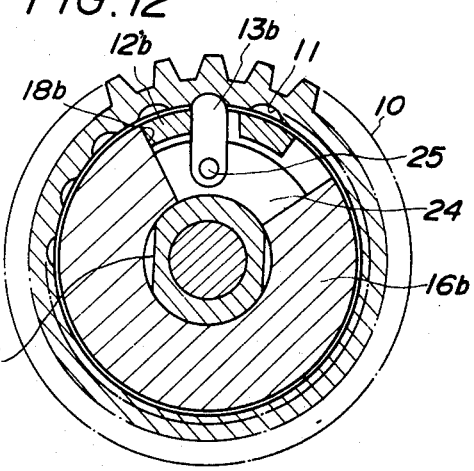
Figure 13:
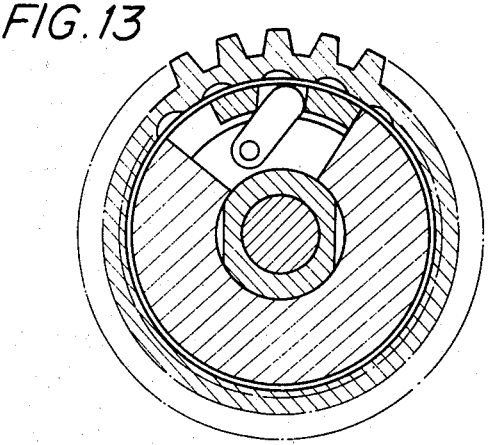
Figure 15:
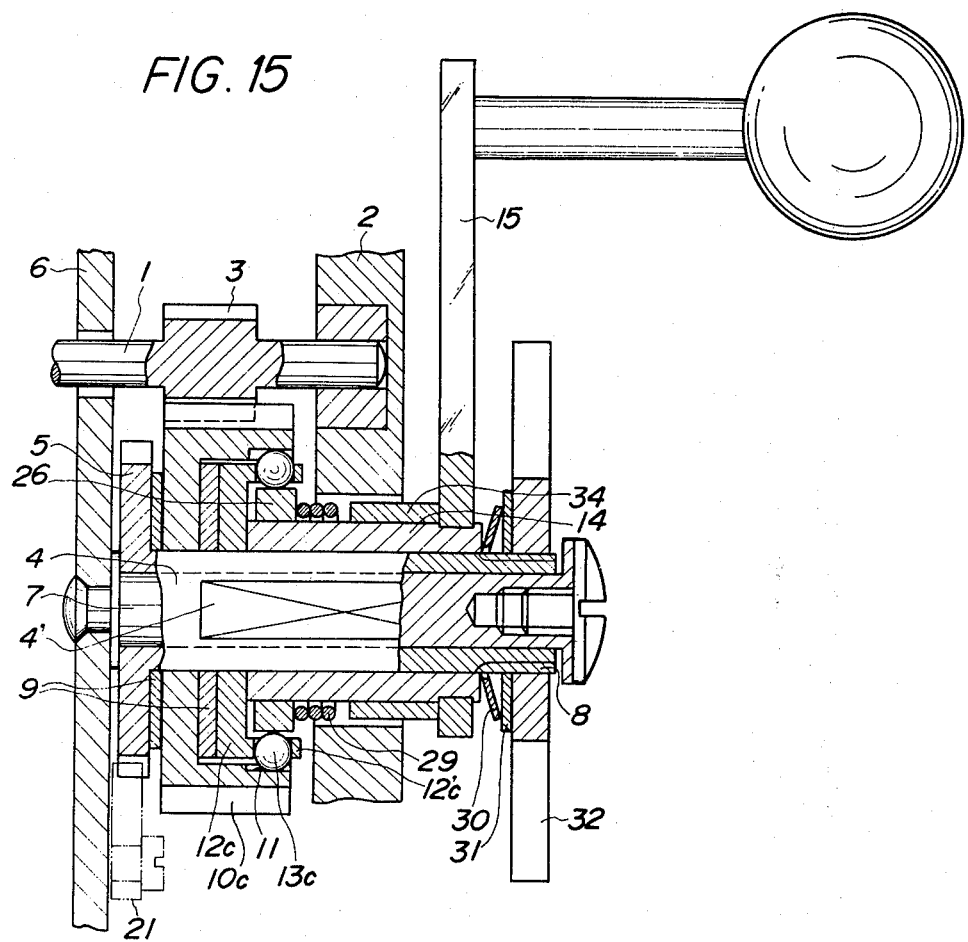
Figure 16:
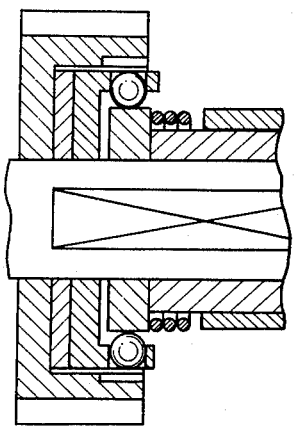
Figure 21:
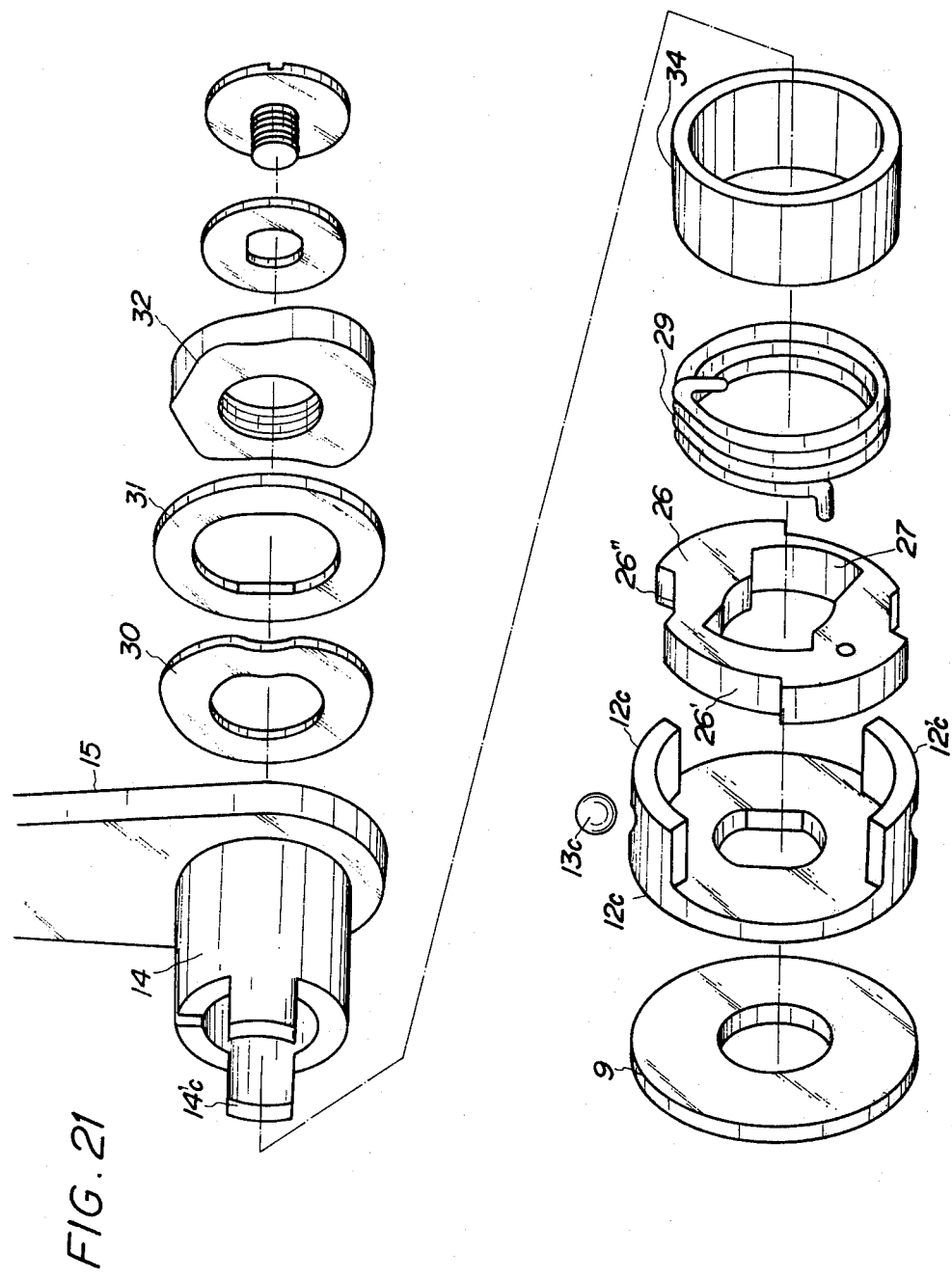

Other objects, features and advantages of the present invention will be readily apparent from the following detailed description of preferred embodiments thereof, taken in conjunction with the accompanying drawings, in which:

FIGS. 1 to 5 show a first embodiment of the present invention, with FIGS. 1 and 2 showing partly cut-away front views of a reel according to the first prefered embodiment of the present invention, FIGS. 3 and 4 showing cross-sectional views of said reel in different modes of operation, and FIG. 5 showing an exploded perspective view of the principal parts of the fishing reel of the instant embodiment;

FIGS. 6 to 10 show a second embodiment of the present invention, with FIGS. 6 and 7 showing partly cut-away front views same as FIGS. 1 and 2, FIGS. 8 and 9 showing sectional views of the device in different modes of operation, and FIG. 10 showing an exploded perspective view of the principal parts of the device;

FIGS. 11 to 14 show a third preferred embodiment of the present invention, with FIG. 11 showing a partly cut-away front view similar to FIG. 1, FIGS. 12 and 13 showing sectional views in different modes of operation, and FIG. 14 being an exploded perspective view of the principal parts; and FIGS. 15 to 21 show a reel according to the fourth embodiment of the present invention, where FIG. 15 is a partly cut-away front view, FIG. 16 is a partly cutaway front view of the principal parts, FIGS. 17 to 20 are sectional views of the reel in different modes of operation, and FIG. 21 is an exploded perspective view of the essential parts of the reel.

The invention is now described in detail by way of some embodiments thereof with reference to the drawings.

Referring first to FIGS. 1 to 5, there is shown a first embodiment where the present invention is adapted to a double-shaft type reel. It will be seen that a spool shaft 1, to which a spool is secured, is rotatably supported by a side plate 2 and carries a gear wheel 3 toward one end thereof. A hollow shaft 4 having at its one end a self-locking ratchet 5 and also having a flat faced portion 4' is rotatably fitted around a fixed shaft 7 which extends from a reel housing plate 6 parallel to the spool shaft 1. A thread 8 is formed at the other end of said hollow shaft 4.

Immediately behind the self-locking ratchet of the hollow rotatable shaft 4 is rotatably mounted a driving gear 10 sandwiched by washers 9, 9. The driving gear 10 is meshed with the gear wheel 3 on the spool shaft 1 and is also formed with a recess in the inside. Along the inner periphery of the recess are formed a plurality of arc-shaped grooves 11 arranged in succession. In this recess of the driving gear 10 is fittably disposed a retainer 12 which is secured to the arcuate stem portion 4' of the rotatable shaft 4 so as to be rotatable therewith. This retainer 12 is provided with two retaining pieces 12', 12' which project sidewise, in opposed relation to each other, from one side of the retainer 12 and each of which is designed to aptly retain locking means or balls 13 that can fit in one of said grooves 11.

A handle shaft 14 carrying at its rear end a crank handle 15 is rotatably fitted on the arcuate stem portion of the rotatable shaft 4 and is also provided at its other end with an operating member 16 disposed behind said retainer 12 with a wave washer 17 interposed therebetween. The operating member 16 consists of a pair of operating portions 18 positioned between said retaining pieces 12', 12' of the retainer 12 so as to be movable clockwise or counterclockwise, a pair of pressure cam portions 18' each being designed to hold the locking ball means 13 in one of the semi-spherical grooves 11, and a pair of release cam portions 18'' each being designed to release or free said ball means 13 from the groove 11 in which this locking means has been retained. Thus, in operation, when the handle shaft 14 is turned in the fishing line reeling-in direction clockwise in FIG. 3, the operating portions 18 engage with the respective retaining pieces 12' to let the retainer 12 turn together with the shaft 14 while the pressure cam portions 18' bring the detention means or balls 13 into engagement with the grooves 11 in the driving gear 10, and when said handle shaft 14 is actuated in the opposite direction, the operating portions 18 are moved backwardly and the balls 13 are freed from the respective engaging grooves in the driving gear 10 by the action of the release cam portions 18''.

In the drawings, numeral 19 indicates a check washer engaged with the rotatable shaft 4 at the rear end of the handle shaft 14, 20 a drag clamping screw threadedly engaged with the threaded portion 8 of said shaft 4, and 21 a pawl for preventing reverse motion of the shaft.

Therefore, when it is desired to reel in the fishing line on the spool, the handle shaft 14 is turned clockwise in FIG. 3, whereupon the operating portions 18 of the operating member 16 secured to the end of said shaft 14 are accordingly moved to abut against the respective retaining pieces 12' of the retainer 12 to rotate the latter clockwise while the pressure cam portions 18' urge the locking means or balls 13 to bring them into engagement with the half-spherical grooves 11 in the driving gear 10, whereby the operating member 16, retainer 12 and driving gear 10 are all engaged as one with each other. Thus, the driving gear 10 forces the spool shaft 1 to rotate through the gear wheel 3 to reel in the line on the spool. At this time, the rotatable shaft 4 engaged with the retainer 12 is also forced to make rotation correspondingly (see FIGS. 1 and 3).

Under such situation, even if the angler lets go his hold on the crank handle 15 as he handles the rod with his both hands for fishing up or for other purposes, the integral joined relation of said three members, that is, the driving gear 10, retainer 12 and operating member 16, is maintained as the self-locking ratchet 5 of the shaft 4 is checked against reverse motion by the pawl 21, and hence the fishing line won't be played out.

When it is desired to play out the line, the handle shaft 14 is slightly moved back counterclockwise to allow the release cam portions 18'' of the operating member 16 to move towards the position of the respective locking means or balls 13 and release them out of the grooves 11 in which they have stayed, whereupon the driving gear 10 arranged freely rotatable relative to the shaft 4 is forced to turn slidingly against the drag of the washers 9, 9, wave washer 17 and other associated elements, thereby allowing the fishing line to advance out. (See FIGS. 2 and 4).

Referring now to FIGS. 6 to 10, there is shown another embodiment of the present invention as adapted to a spinning reel. This embodiment differs from the preceding one in that a worm wheel 10a is used in place of the driving gear 10, such worm wheel being meshed with a worm 3a of a rotating shaft 22 fitted on the spool shaft 1 so as to make rotation of the rotor (not shown) to thereby reel in the fishing line on the spool while suitably controlling the movement of the line with the rotor. Also, the retainer 12a is provided with retaining pieces 12' only at one peripheral location, and a tongue 13'a of a ringshaped locking member 13a is held between said retaining pieces 12'a while the ring-shaped body portion of said member 13a is fitted on an eccentric cam ring portion 23 of the operating member 16. Projecting from the outer peripheral face of the operating member 16 are operating portions 18 designed to be engaged with the retaining pieces 12'a of the retainer 12a when the operating member 16 is actuated.

Thus, for reeling in the fishing line on the spool in this reel, the handle shaft 14 is turned counterclockwise, whereupon, as shown in FIG. 8, the operating portions 18 of the operating member 16 abut against and push the left sides of the corresponding retaining pieces 12'a of the retainer 12a to allow it to rotate while the eccentric cam ring 23 forces the tongue 13'a of the locking member 13 outwardly to let it engage in one of the halfspherical grooves 11 in the driving gear 10a, whereby the operating member 16, retainer 12a and driving gear 10a are coupled integral with each other to make the rotor rotate through the worm 3.

Under this condition, even if the angler lets go his hold of the handle shaft 14a, the fishing line won't be played out since the self-locking ratchet 5 of the rotary shaft 4 is withheld against backward movement by a pawl 21. Then, when the handle shaft 14a is moved back in the opposite direction, the tongue 13'a of the locking member 13a is released from the groove 11 in the driving gear 10a by the action of the eccentric cam ring 23 of the operating member 16, so that the fishing line is now played out against the drag see FIG. 9.

In FIGS. 11 to 14 is shown still another embodiment where the present invention is applied to a doubleshaft type reel. The operating member 16b is shaped like a disc and formed with a recess 24 designed such that its shoulder portion 18 serves as an acting part. A pawl-like locking member 13a is pivotaly mounted to said recessed portion 24 of the operating member 16b by a pin 25, and said locking member 13 is engaged in or disengaged from one of the half-spherical engaging grooves 11 in the driving gear 10b while regulating the movement of the locking member with the retainer 12b, by utilizing the link mechanism operated in accordance with rotation of the operating member 16b.

According to the present invention, as described above, when the handle shaft is turned in the direction for reeling in the fishing line, the shaft is directly coupled with the shaft of a spooling member or a rotor FIG. 12, while when the handle shaft is slightly turned back in the opposite direction, it forms a friction coupling with the shaft of the spooling member or rotor to allow play out of the fishing line FIG. 13, and further and more important, according to the present invention, the circumferential movement of the locking means engageable with the driving gear is regulated by a regulating member or retainer which is integrally secured to a rotatable shaft having a self-locking ratchet, and the operating member of the handle shaft is coupled with the driving gear through the medium of the retainer, so that even if the handle shaft is freed (that is, even if the angler lets go his hold of the handle rod) in a state where the fishing line stays played up on the spool, the fishing line won't be played out, and therefore forced wind-up or play-out of the line or holdback of the line from being played out from the reeled-in state can all be effected merely with a simple handle operation. This makes it possible to quickly and properly perform any momentary angling action and also greatly facilitates the whole fishing operations. The invention can be also embodied in various types of reels ranging from those used for shore fishing to those used for boat fishing.

A fourth embodiment of the present invention is now described with reference to FIGS. 15 to 21. This embodiment is identical with the first embodiment shown in FIGS. 1 to 5 except for the following points. That is, the rotatable handle shaft 14c provided with a crank handle 15 at its rear end is fitted for rotation on the arcuate stem portion of a hollow shaft 4 and carries at its other end a cam disc 26 which is freely movable through a certain distance. The handle shaft 14 is provided at its front end with engaging protuberances 14'c, 14'c which have a length greater than the thickness of the cam disc 26 and fit movably in the corresponding recesses 27 in the cam disc 26 such that the handle shaft 14c can move through a certain distance without causing a corresponding angular rotation of the cam disc 26.

The cam disc 26 fits in a retainer 12c and consists of the acting cam portions 26' each being designed to hold a ball 13c in an engaging groove 11 and release cam portions 26'' each being designed to release the ball 13c out of the groove 11 in which this ball has stayed. Disposed outside of the cam disc 26 and mounted around the handle shaft 14 is a coil spring 29 of which both ends are secured to the cam disc 26 and handle shaft 14, respectively. The biasing force of said coil spring 29 is weaker than the drag force.

On the threaded portion 8 of the hollow shaft 4 in the rear of the handle shaft 14c is threadedly engaged a drag adjusting clamp screw 32 through a wave washer 30 and check washer 31 so that the clamp screw 32 will be movable back and forth. Reference numeral 34 indicates a collar.

Figure 17:
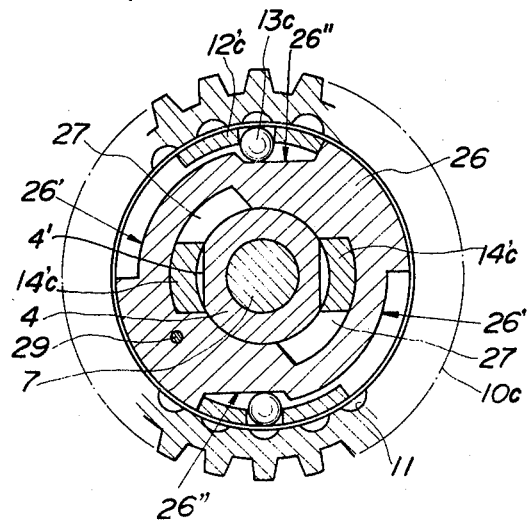
Figure 18:
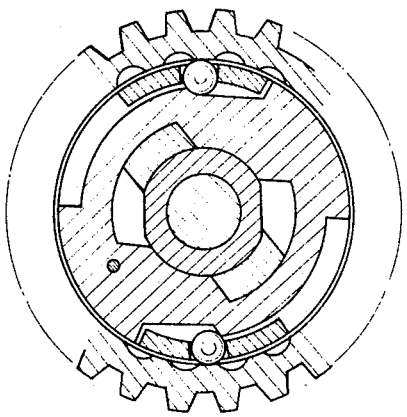
Figure 19:
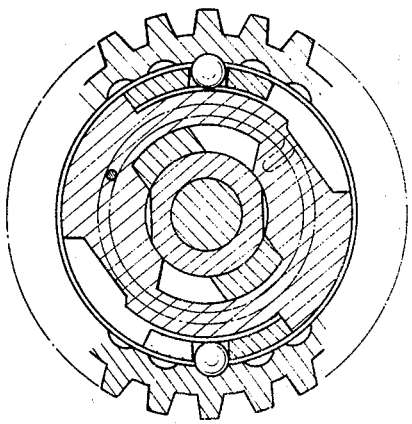
Figure 20:
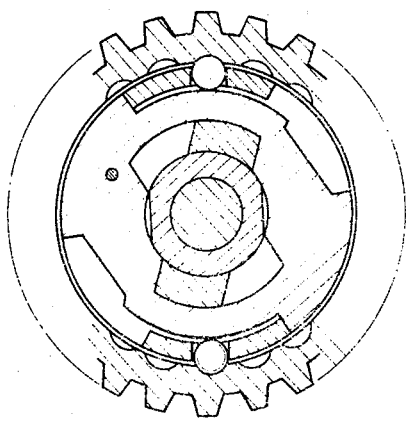

In operation of the present device which has the above-described arrangements, when it is desired to reel in the fishing line, the handle shaft 14c is turned clockwise from the position of FIG. 17, whereby the protuberances 14'c, 14'c at the front end of the handle shaft are urged to move in the respective recesses 27 in the cam disc 26 surmounting the opposing force of the spring 29 until said protuberances hit against the right end walls of said respective recesses (see FIG. 18), while the spring 29 pulls and rotates the cam disc 26 to let its acting cam portions 26' abut against the respective retaining pieces 12'c of the retainer 12c and at the same time bring the balls 13c into engagement in the corresponding grooves 11 in the driving gear 10 (see FIG. 19). If the handle shaft 14c is further turned, its engaging protuberances 14'c, 14'c again move in the respective recesses 27 until they impinge against the right end walls of said respective recesses to integrally couple the handle shaft 14c and cam disc 26 (see FIG. 20) to thereby reel in the fishing line. At this time, the hollow shaft 4 secured to the retainer 12c is also rotated correspondingly.

Under such condition, even if the angler lets loose the handle shaft 14c as he is compelled to handle the rod with his both hands for fishing up or for other reasons, the fishing line is maintained in its played-out state since the self-locking ratchet 5 of the hollow shaft 4 is checked against reverse motion by a pawl 21 and also because the handle shaft 14c is retained in its position by the drag. Thus, the driving gear 10, retainer 12c and cam disc 26 are all maintained in the mutually joined situation to prevent play-out of the fishing line (see FIG. 20).

For playing out the fishing line, the handle shaft 14'c is turned counterclockwise. Whereby the engaging protuberances 14'c, 14'c at the end of the shaft are caused to move in the respective recesses 27 in the cam disc 26 until they abut against the left end walls of said respective recesses, and then push and turn the cam disc 26 counterclockwise until its release cam portions 26'' move to the position of the respective balls 13c to allow said balls to move out of the grooves 11 in the driving gear 10c, causing the driving gear 10c, which is freely rotatable relative to the hollow shaft 4, to move slidingly against the drag actions of the washers 9, 9, wave washer 20 and other related elements to thereby play out the fishing line (see FIG. 17).

According to the present device, as in the conventional devices, the handle shaft, when turned in the fishing line reel-in direction, is directly connected to the spool shaft and when the shaft is slightly turned back in the opposite direction it is frictionally coupled with the spool shaft to allow play-out of the fishing line. In addition to this, the present device is further featured in that a retainer is mounted on the hollow shaft having a self-locking ratchet, and balls are retained by this retainer in such a manner that the balls are engageable in or disengageable from the corresponding half-spherical grooves formed in the driving gear, and further the cam disc designed to effect such engagement and disengagement of said balls is connected to the handle shaft by a spring such that the cam disc is freely movable through a predetermined distance, so that even if the angler lets loose the handle shaft in a state where the fishing line stays played up on the spool, play-out of the fishing line is automatically checked. Also, the proposed arrangement of the present invention allows smooth and easy rotation of the handle shaft particularly when the balls are positioned at the edges of the respective engaging grooves in the driving gear for reeling in the fishing line, and hence wear of the cam disc is minimized. Further, once the handle shaft is properly set in the line reel-in direction, the driving gear is automatically slipped by the drag force to permit the balls to fit smoothly into the corresponding engaging grooves in the driving gear no matter where the balls are position with respect to such engaging grooves. Thus, the present device, when adapted in a ball-type reel mechanism, proves extremely useful and practical as it permits very easy and sure engaging and disengaging operation of the handle shaft relative to the driving gear.

Although some illustrative embodiments of the present invention have been described herein with reference to the accompanying drawings, it is to be understood that the invention is not limited to that precise embodiments and that various changes and modifications may be effected therein by one skilled in the art without departing from the scope or spirit of this invention.

What is claimed is:

1. A fishing reel, comprising:
   a fixed shaft;
   a hollow rotatable shaft disposed about said fixed shaft;
   self-locking means fixedly connected to said rotatable shaft for allowing rotation of said shaft in a first direction and preventing rotation in the second direction;
   a spool shaft;
   a gear wheel secured to said spool shaft;
   a driving gear meshed with said gear wheel;
   locking means for engaging and disengaging said driving gear;
   retaining means fixedly connected to said rotatable shaft for controlling the circumferential movement of said locking means;
   handle means; and
   operating means connected to said handle means for causing said locking means to engage said driving gear and thus connect said driving gear with said handle means when in one position with respect to said retaining means which position is reached by turning said operating means in said first direction and for causing said locking means to disengage said driving gear and thus disconnect said driving gear from said handle means when in another position with respect to said retaining means which other position is reached by turning said operating means in said second direction.

2. A fishing reel according to claim 1, wherein said locking means are balls.

3. A fishing reel in accordance with claim 1, in which said driving gear has engaging grooves formed in the inner side thereof and wherein said locking means engages and disengages said grooves in said driving gear.

4. A fishing reel in accordance with claim 1, wherein said self-locking means comprises a ratchet.

5. A fishing reel in accordance with claim 1, wherein said gear wheel is disposed coaxially with said spool shaft, and said driving gear, and said operating means are disposed coaxially about said fixed shaft.

6. A fishing reel in accordance with claim 3, wherein said locking means comprises an annular ring having a radially outwardly extending projection thereon.

7. A fishing reel in accordance with claim 1, wherein said retaining means comprises an annular disc coaxial with said fixed shaft, said disc having at the circumferential edge thereof at least one retaining piece extending between said operating means and said driving gear so as to receive said locking means.

8. A fishing reel in accordance with claim 2, wherein:
   said operating means comprises a cam disc having a first cam position on the outer periphery thereof for forcing said ball into engagement with said groove and a second cam position on the outer periphery thereof for allowing said ball to disengage from said groove, said cam disc having recesses therein;
   said handle means having protuberances thereon movably disposed within the recesses of said cam disc; and
   further including spring means disposed between said handle shaft and said cam disc.

* * * * *

UNITED STATES PATENT OFFICE
CERTIFICATE OF CORRECTION

PATENT NO. : 3,874,615
DATED : April 1, 1975
INVENTOR(S) : Noriyasu Fukushima

It is certified that error appears in the above-identified patent and that said Letters Patent are hereby corrected as shown below:

Column 6, line 9, "shaft 14" should read --shaft 14c--

Signed and Sealed this thirtieth Day of September 1975

[SEAL]

Attest:

RUTH C. MASON
Attesting Officer

C. MARSHALL DANN
Commissioner of Patents and Trademarks